UNIVERSAL REPRODUCING STYLUS

Filed July 20, 1949 4 Sheets-Sheet 1

INVENTOR.
JOHN DRYSDALE REID
BY
Alden J. Redfield
Charles Marshall Hogan
ATTORNEYS Feb. 5, 1952 J. D. REID 2,584,922

UNIVERSAL REPRODUCING STYLUS

Filed July 20, 1949 4 Sheets-Sheet 2

INVENTOR.
JOHN DRYSDALE REID
BY
Alden D. Redfield
Charles Marshall Hogan
ATTORNEYS UNIVERSAL REPRODUCING STYLUS
Filed July 20, 1949 4 Sheets-Sheet 3
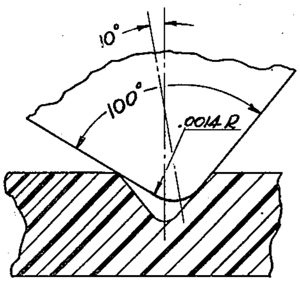
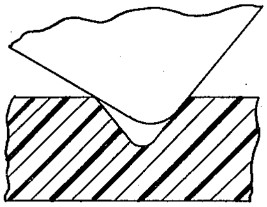
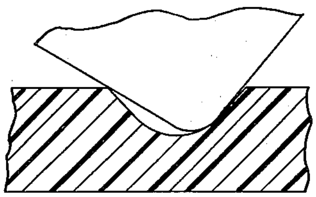
Fig. 5 Fig. 6 Fig. 7
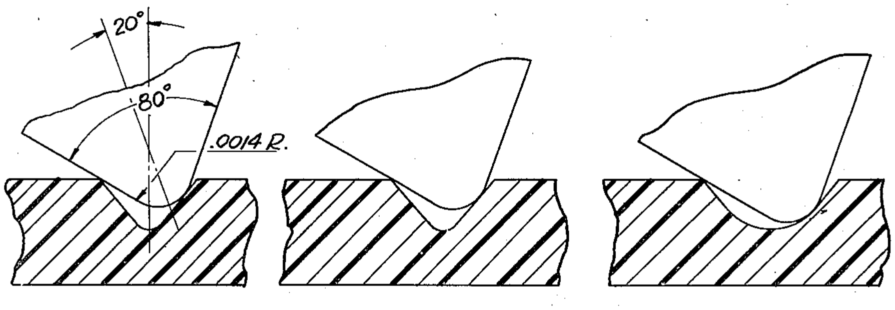
Fig. 8 Fig. 9 Fig. 10
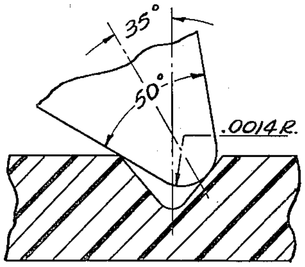
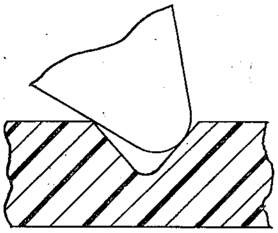
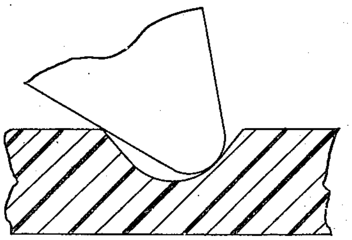
Fig. 11 Fig. 12 Fig. 13
INVENTOR.
JOHN DRYSDALE REID
BY
Alden D. Redfield
Charles Marshall Hogan
ATTORNEYS Feb. 5, 1952 J. D. REID 2,584,922

UNIVERSAL REPRODUCING STYLUS

Filed July 20, 1949 4 Sheets-Sheet 4

INVENTOR.
JOHN DRYSDALE REID
BY
Alden D. Redfield
Charles Marshall Hogan
ATTORNEYS

UNITED STATES PATENT OFFICE 2,584,922

UNIVERSAL REPRODUCING STYLUS

John Drysdale Reid, Cincinnati, Ohio, assignor to Avco Manufacturing Corporation, Cincinnati, Ohio, a corporation of Delaware Application July 20, 1949, Serial No. 105,696

1 Claim. (Cl. 274—38)

Figure 1:
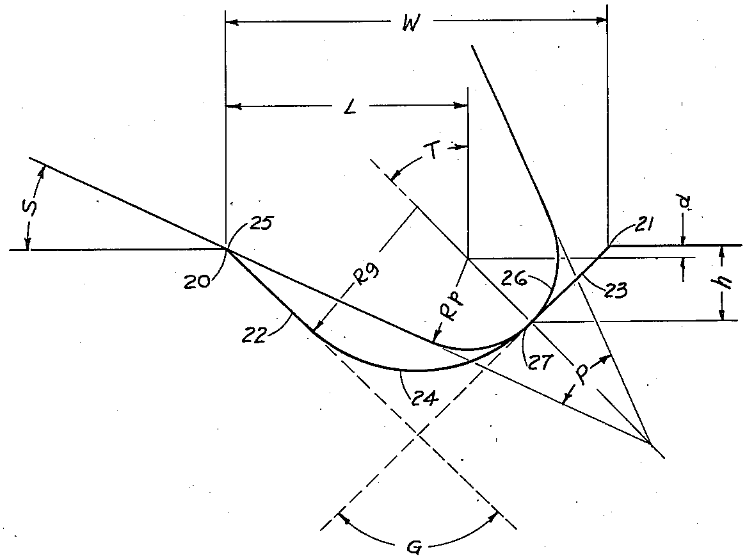

The present invention relates to a vibration translating device, including a tilted stylus, for use with phonographs, such device having the capacity of properly tracking the distinct types of grooves in standard sound disc records and in "long playing" or fine groove records.

At the present time the availability of, and the strong business competition between the manufacturers of, three distinct types of record discs, has imposed a severe hardship on the consuming public in that no needle heretofore offered for sale has the capacity successfully to follow the distinct types of grooves used in these discs. A further burden has been imposed on the public by the absence of a turntable which can support all three types. It is believed that the devices shown and claimed in my copending U. S. Patent Applications, Serial Nos. 78,949, now Patent No. 2,577,035, issued December 4, 1951, and 90,716, filed in the U. S. Patent Office on March 1, 1949, and April 30, 1949, entitled "Universal Phonograph Turntable" and "Universal Sound Reproducing Stylus," respectively, and assigned to the same assignee as the present application and invention, successfully solve the turntable and stylus problem.

The primary object of the present invention is to provide another type of vibration translating device, including a stylus, which can be successfully employed in playing any one or all of the three major types of record discs. The worthiness of this object is indicated by the discussion immediately following.

A bitter competitive struggle is now in existence, involving the standard large-diameter 78 R. P. M. record disc, the long playing 33⅓ R. P. M. Columbia discs, and the seven-inch 45 R. P. M. RCA disc. The present invention provides a stylus construction which may be used with any of these types of record discs.

The term "standard record discs" is hereinafter used to designate the large-groove 78 R. P. M. types. In accordance with present day practice, the so-called standard discs conform to the following specifications:

*United States*

88° groove angle
.006 inch width of groove
.0023 inch bottom radius of groove

*England*

88° groove angle
.0065 inch width
.0017 inch bottom radius

The following standards have been proposed:

*United States*

90° groove angle ±5°
.006 inch groove width minimum
.0025 inch groove radius ±.0005 inch

*England*

87.5° groove angle ±2.5
.0067 inch groove width
.00165 inch groove radius ±.00015 inch B. E. C. Mittell, in his informal lecture entitled "Commercial Disc Recording and Processing," delivered to the Radio Section of the Institution of Electrical Engineers, Great Britain, on December 9, 1947, printed by permission of the Institution of Electrical Engineers, Savoy Place, London, W. C. 2, states that present day English grooves vary from 95° with a .0023 inch bottom radius and a .0024 inch depth to a minimum of 86.5° with a .0015 inch bottom radius and a depth of .0029 inch. He also cites a 1936 English record put out by H. M. V. (DB2605, side 1) which had a 96° groove with a bottom radius of .0025 inch and a depth of .0021 inch resulting in a width of .0067 inch. This was stated to be representative of the practice in 1936.

H. Courtney Bryson, in his book "The Gramophone Record," published in 1935 by Ernest Benn Ltd., London, states that the average groove was .006 inch wide and .0025 inch deep. He states that the depth of grooves varies from .0018 inch to .0035 inch, the average being .0025 inch. His figure 35 shows a groove which is .006 inch wide and .0025 inch deep and has a 75° angle. At page 79 he states that the groove angle has been varied from 60° to 90° with the groove depth kept approximately .0025 inch by changing the bottom radius; that the practice has been to use a small bottom radius of about .0015 inch for 90° grooves and a wide bottom radius of .003 inch for 60° grooves. At page 80 are photographs of the cross-sections of four makes of records. Scaling these drawings would indicate as follows:

The Columbia records had groove angles of

95°, were .007 inch wide, and had a .0023 inch bottom radius.

The Decca grooves had an angle of 97°, were .007 inch wide, and had a bottom radius of .0025 inch.

The Regal paper records had a groove angle of 85°, a groove width of .0075 inch, and a bottom radius of .0035 inch.

The Polydor records had a groove angle of 90°, a groove width of .0075 inch, and a bottom radius of .0023 inch.

It is understood that some 78 R. P. M. records have been sold in the United States with a groove angle of approximately 100°. The maximum record groove dimensions for standard record discs which would be encountered in practice at the present time are approximately as follows:

100° angle
.006 inch width
.0023 inch bottom radius

The dimensions of 33⅓ and 45 R. P. M. fine groove records used in present day practice are next considered. According to RCA record drawing No. P327117, dated December 13, 1948, the RCA record groove is held to a maximum width of .003 inch but may go down to a minimum of .0025 inch. Other dimensions of this groove are:

Included angle—85°±5°
Bottom radius—.00025 inch maximum
Lead out and eccentric grooves—same dimensions According to Columbia drawing No. TD203 dated December 2, 1948, the groove width is held to a minimum of .0027 inch and is allowed to vary to a maximum of .0030 inch. Other dimensions are:

Groove angle—87°±3°
Bottom radius—.0002 inch maximum
Lead out groove and eccentric spiral—increased in depth to .003 inch $$\begin{matrix} +.0005 \text{ inch} \\ -.000 \end{matrix}$$

making width .006 inch approximately.

In July 1948, I measured a group of six Columbia records and found that the groove width averaged .00277 inch but varied from .00211 inch (#2008, side 2) to .00383 inch (#4028, side 1). It appears that the minimum width of fine groove records to be encountered in practice approximates .0021 inch. It will be understood, of course, that same fine groove record discs are designed for a speed of 78 R. P. M.

The above considerations have compelled the public to purchase at least two distinct types of needles and to go to the trouble of adjusting record players to place one or the other type of needle into operation, depending on the type of disc to be played. Some crystal cartridges are equipped with two needles, one of which becomes an undesired mechanically resonant system when the other is used. At best, such cartridges must be adjusted to select one needle or the other. Alternatively, consumers are forced to use one type of disc exclusively and are deprived of the use of the other types. These hardships have created a great amount of confusion, caution, and sales resistance on the part of the public and have contracted the market for record changers, record players, and combination radio-phonograph sets. Therefore the need for a universal-type phonograph needle is very urgent. The present invention and that of my copending patent application Serial No. 90,716 are directed to the satisfaction of that need.

Accordingly, the primary object of the present invention is to provide a vibration translating apparatus, including a stylus, which accurately and faithfully follows the modulations of both standard and fine groove record discs.

The principal advantages flowing from the use of the invention are as follows:

(1) Operation is simplified in that turntable speed is the only variable which must be selected in accordance with the type of disc to be played;

(2) There is no necessity to replace a needle or vary the tilt or turn of a cartridge when selecting a different type of record disc;

(3) No tone-arm weight change is required;

(4) The vibration translating device tracks all commercially-employed records, the 78 R. P. M. standard and fine groove types, the 45 R. P. M. fine groove type, and the 33⅓ R. P. M. standard and fine groove types;

(5) The vibration translating device reduces manufacturing costs of the phonograph as a whole, in that it eliminates one or more of a plurality of needles, tone-arm weight-changing levers, tone-arm cartridge bearings, certain amplifier stages and compensation networks;

(6) The stylus in the vibration translating device is positively driven by both side walls of the groove.

Another important object of the present invention is to provide a vibration translating apparatus, including a stylus, which is so arranged as to minimize record disc and stylus wear. Since the width of the fine grooves is less than the width of the standard grooves, the areas of the stylus which contact the fine grooves are not coextensive with the areas which contact the standard grooves. The construction in accordance with the invention enhances the life of the stylus and capitalizes on the divergence of stylus wear areas. These advantages are further enhanced by a feature of the invention in accordance with which the stylus may be tilted in either direction.

As stated in my U. S. Patent No. 2,251,204, issued July 29, 1941, entitled "Sound Reproduction" and assigned to the same assignee as the present application and invention, it has been found that the bottom portion of a record disc groove does not cut so cleanly as the upper part of the groove, greater pressure being required to cut the full depth and to push away the tailings. This factor causes the lower part of the groove to become irregular and imperfect. A reproducing stylus which follows the bottom part of the groove is affected by these irregularities, resulting in a loss of electrical response to the desired modulation, in increased distortion and response to undesired modulation. It might also be mentioned that records are often formed by the use of a stamper which presses a mass of moldable material into final form. The raised portions of the stamper are those which correspond to the bottom of the groove, and it is these raised portions which receive the greater wear during the manufacturing process and which are most subject to being marred or scratched during processing. Consequently every imperfection present upon the exposed surface of the stamper appears in exact replica at the bottom of the groove and thus aggravates the inherent irregularities of the bottom of the groove. The stylus included in the vibration translating apparatus of the present invention does not ride upon these irregular and imperfect portions, and the undesirable effects thereof are not present in the output of a reproducing device with which the invention is employed.

For a better understanding of the present invention, together with other and further objects, advantages and capabilities thereof, reference is made to the accompanying description of the drawings, in which there are illustrated several embodiments of the invention.

Figure 2:
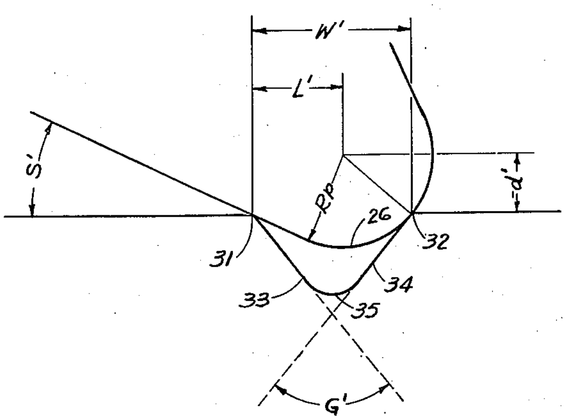
Figure 3:
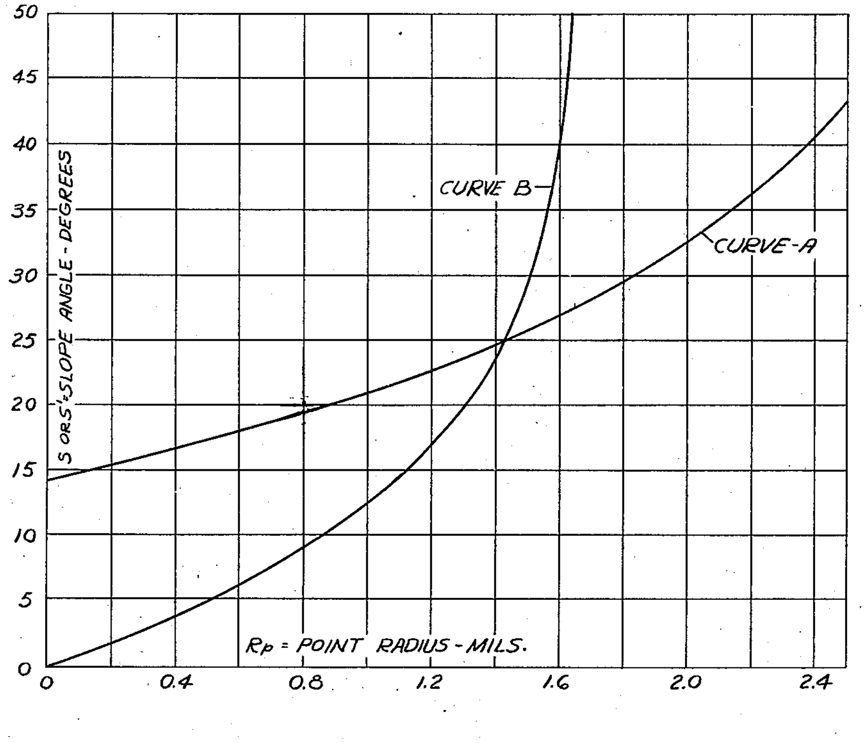
Figure 4:
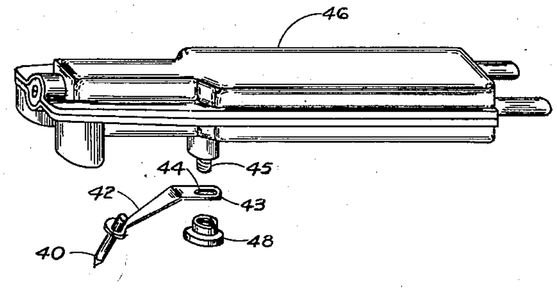

In the drawings, Fig. 1 is employed as an aid in developing the mathematical relationship which must be satisfied by a tilted stylus for operation with standard groove record discs; Fig. 2 is similarly used to develop the mathematical relationship which must be satisfied by a tilted stylus for operation with fine groove record discs; Fig. 3 is a set of curves showing the required relationship between slope angle and tip radius for standard grooves and fine grooves; Fig. 4 is a perspective view of a stylus and cartridge assembly suitable for use with the invention. Figs. 5–7, 8–10, and 11–13 are three groups of figures showing, in greatly enlarged form, three suitable stylus sizes, progressing from top to bottom, a 100° conical stylus tilted at 10°, an 80° stylus tilted at 20°, and a 50° stylus tilted at 35°, together with stylus grooves into which each stylus fits, progressing from left to right, an RCA type of fine groove, a Columbia type of fine groove, and a standard groove; Figs. 14, 15, 16, and 17 show, respectively, an embodiment of the invention in which the stylus is tilted by bending of the stylus spring, an embodiment in which the stylus is tilted by tilting the crystal cartridge, an embodiment in which the connector between cartridge and spring is tilted, and a fourth embodiment in which the tone arm itself is tilted.

In accordance with the invention, there is provided in a sound-translating device of the type which includes a tone arm and means secured to the tone arm for generating electrical signals representative of sound as modulated on any one of a plurality of distinct types of record discs having laterally modulated grooves, a novel vibration translation device. This device controls the signal generator, generally a piezo-electric crystal, in accordance with the modulations. The device comprises a stylus having a tip and an upper groove contacting portion. The device also comprises mounting means secured to the generator or crystal for supporting the stylus at an angle with respect to the plane of the record disc. This angle is transverse to any of the grooves and is so determined that the tip of the stylus contacts the side of the largest one of the grooves at a point not lower than, and preferably above, the line of tangency between the arcuate bottom of the largest groove and the side of the largest groove. The angle is also so determined that the stylus contacts the smallest one of the grooves at a point below the shouldered top of the smallest groove. While the tip of the stylus always contacts a side of a groove, the other groove-contacting portion of the stylus always contacts the shouldered top of the groove on the side opposite to the side contacted by the tip. The present invention contemplates the combination of a stylus and means for positioning the stylus at a transverse angle so that it fits into and is positively driven at two points by a groove, whether it be a fine groove or a standard groove. The stylus makes contact on the top side wall or shoulder of one side of the groove and also with the other side wall of the groove, thus affording positive drive from the lateral modulations of the groove. It has been determined that a stylus having an included angle of 80° and a tip radius of 0.0014 inch performs satisfactorily in both standard and micro-groove records when set at an angle of 20° from the vertical, for example. I have also found that a stylus designed for fine groove records can be made to operate satisfactorily with both fine groove record discs and standard groove record discs when included in combination with means which tilts the stylus at a transverse angle on the order of 35° from the vertical.

I have found that a conical stylus having an included angle, slightly smaller than that of the smallest-angle record groove, and a curved tip, can be used on all of the three types of records when the stylus is tilted to the side and fixed. Additionally, the factors determinative of the angle of tilt have been ascertained. The limiting factors are as follows:

(1) A portion of the stylus must rest on one edge or shoulder of the largest groove to be encountered in practice, and at the same time the stylus tip must touch the opposite wall at or above the point of tangency of the bottom radius and the straight portion of the groove side wall;

(2) A portion of the stylus must rest on one edge or shoulder of the smallest groove to be encountered in practice and must be tangent to the opposite wall at or below the top edge of the side wall.

These conditions are illustrated in Figs. 1 and 2, the pertinent dimensions being indicated by symbols as follows:

W designates the groove width of an assumed large groove;
G is the included angle of such large groove;
$R_g$ is the bottom radius of the large groove;
$R_p$ is the tip radius of the stylus;
P is the included angle of the stylus tip;
T is the angle of sideward tilt of the stylus away from the vertical;
S is the angle between the side of the stylus and the plane of the record disc surface.

Prime marks are employed to designate the corresponding dimensions of an assumed fine groove, the fine groove being symbolically illustrated in Fig. 2, while the large groove is illustrated in Fig. 1.

Other dimensions such as L, $d$, and $h$ are used in deriving the relations involved. L is the horizontal projection of the distance between the point of contact of groove shoulder and stylus and the locus from which the radial tip is generated; $d$ is the vertical projection of the distance between the plane surface of the record disc and said locus; $h$ is the vertical projection of the distance between the top plane of the record disc and the point of contact between stylus tip and groove side wall.

It will be observed that in the combination in accordance with the invention there is included a stylus having a virtually truncated portion which terminates in a circular tip, having a radius $R_p$. The included angle of this truncated portion is designated by the symbol P. I have found that when P is decreased, the angle T must be increased in order to satisfy the required conditions of operation outlined above. In other words, a sharper conical stylus requires a greater angle of tilt.

Referring now to Fig. 1, there is shown a large groove having top shoulders 20 and 21, side walls 22 and 23, and an arcuate bottom 24, the cross-section of which is generated by a radius $R_g$. The stylus has a portion 25, which contacts shoulder 20, and a tip 26 which contacts side wall 23, opposite to shoulder 20, at a point 27 below shoulder 21, just at the point or line at which bottom 24 is tangent to wall 23. Under these conditions:

$$h=\left(\frac{W}{2}-R_g\cos\frac{G}{2}\right)\frac{1}{\tan\frac{G}{2}}$$

$$d=h-R_p\sin\frac{G}{2}$$

$$L=\frac{W}{2}+(R_g-R_p)\cos\frac{G}{2}$$

$$\sin S=\frac{R_p}{L-\frac{d}{\tan S}}$$

and $$R_p=\frac{\left(\frac{W}{2}+R_g\cos\frac{G}{2}\right)\sin S-\left(\frac{W}{2}-R_g\cos\frac{G}{2}\right)\frac{\cos S}{\tan\frac{G}{2}}}{1-\sin\left(\frac{G}{2}-S\right)}$$

Curve A in Fig. 3 shows the relation between S and $R_p$ when the conditions of Fig. 1 are satisfied. Values of S, slope angle in degrees, between the side of the stylus and the record disc plane surface, are plotted as ordinates against values of $R_p$, the stylus tip radius, as abscissae.

Curve A is based on the following given data, $R_g$=0.0025 inch
W=0.006 inch
G=93°

$$\text{which makes } R_p=\frac{4.7\,\text{Sin}\,S-1.3\,\frac{\cos S}{\tan\frac{G}{2}}}{1-\text{Sin in }(46.50°-S)}$$

It will be observed that, if it be assumed that the stylus tip is tangent to wall 23 just at the point where the groove bottom is tangent to wall 23, an increase in tip radius must be accompanied by an increase in the slope angle. When the tip is to be made tangent to wall 23 at a point above the point at which the groove bottom is tangent to wall 23, then S must be less than the critical value plotted in curve A, Fig. 3.

Referring to Fig. 2, there is shown a fine groove having top shoulders 31 and 32, side walls 33 and 34, and an arcuate bottom 35. The stylus has a portion which contacts shoulder 31, and a tip 26, which contacts groove side wall 34, opposite to shoulder 31, at shoulder 32. Under these conditions:

$$h'=0$$

$$d'=R_p\sin\frac{G'}{2}$$

$$L'=W'-R_p\cos\frac{G'}{2}$$

$$\sin S'=\frac{R_p}{L'-\frac{d'}{\tan S'}}$$

and $$R_p=\frac{W'}{\cos\frac{G'}{2}-\sin\frac{G'}{2}\Big/\tan S'+\frac{1}{\sin S'}}$$

Curve B in Fig. 3 shows the relations between S' and $R_p$, when the conditions of Fig. 2 are satisfied. Values of S' are plotted as ordinates against values of $R_p$ as abscissae. It will be noted that S' again increases with $R_p$ but at a greater rate than the increases of S with $R_p$. When the tip is to be made tangent to wall 34 at a point below shoulder 32, then S' must be greater than the critical value plotted in curve B, Fig. 3.

Curve B is based on the following given data, $R'_g$=0.0005 inch
W'=0.0025 inch
G'=80°

$$\text{which makes } R_p=\frac{2.5}{.7660-\frac{.6428}{\tan S'}+\frac{1}{\text{Sin }S'}}$$

Since the slope angle must be less than the critical value plotted in curve A and greater than the critical value plotted in curve B, the values of slope angle employed in practice are those included in the area between the two curves to the left of their intersection, which occurs at a point where the slope angle is equal to 25° and $R_p$=0.00142 inch. Now, then, if the slope angle is taken equal to 25°, the largest value of the stylus cone included angle (P) for the small groove is determined as follows:

$$P=90°-S'+\frac{G'}{2}=90°-25°+40°=105°$$

The largest value of the stylus cone included angle for the large groove is determined as follows:

$$P=90°-25°+46.5°=111.5°$$

Accordingly, a stylus cone angle not exceedingly 105° may be employed, when S is taken equal to 25°. However, in order to minimize the tilt angle (T), the included angle (P) of the stylus cone must be as large as possible, for $$T=90°-S-\frac{P}{2}=90°-25°-52.5°=12.5°$$

in the particular example. Generalizing, the angle of tilt must be increased as the sharpness of the conical stylus is increased.

It will be understood that stylus cone angles considerably smaller than 105° may be used, and such cone angle can be even smaller than the groove angle of the smallest groove to be encountered in practice. When the stylus cone angle is decreased, the tilt angle is increased by an amount equal to one-half the decrease in cone angle.

Having discussed in detail the factors which determine the dimensions of a stylus suitable for employment in the combination in accordance with the invention, the description now proceeds to a detailed discussion of the means utilized to impart to the stylus an initial tilt. In the claims appended hereto, such expressions as the following are employed: "mounting means for so supporting said stylus" and "means for supporting said stylus." Such expressions are employed as proper collective terms to designate the various specific mounting arrangement that may be employed in order to impart a transverse tilt to the stylus.

Referring now to Fig. 4, there is shown a suitable stylus assembly for use with the invention. The needle 40 is secured as by press fitting to a spring 42 which terminates at its other end in a lug 43 including an aperture 44 through which a mechanical connector member 45 projects. The member 45 is secured to the cartridge 46 in a conventional fashion and its lower end is screw-threaded to interfit with a knurled binding nut 48. The parts are shown in diassembly for purposes of clarity, and the assembly in which the parts are fitted together is so obvious to those skilled in this art as not to require further discussion. The cartridge 46 is secured to a tone arm 49.

Figure 14:
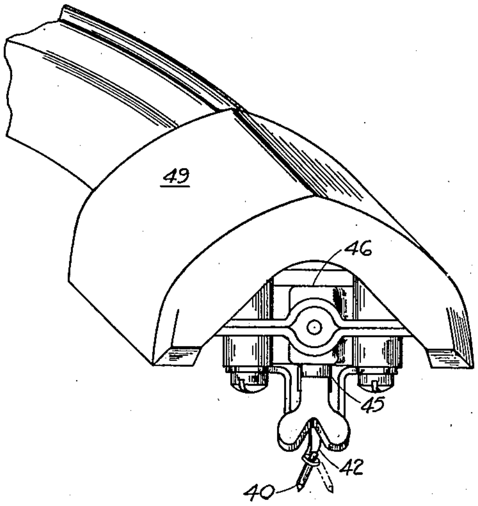

Referring now to Fig. 14, the electric signal generator or piezo-electric crystal cartridge 46 is secured to the tone arm in conventional fashion and tilt is imparted to the needle by twisting of the spring 42. The mounting means in this embodiment comprises the twisted spring 42 and the conventional elements 43, 44, 45, and 48.

It will be observed that the spring can be twisted in either direction as suggested by the full line and the dashed line positions of the needle in Fig. 14.

Figure 15:
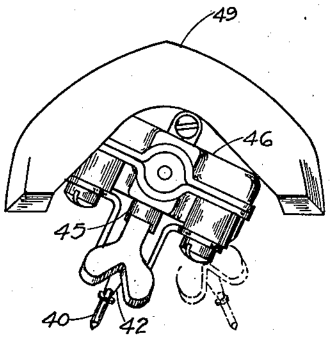

In the Fig. 15 embodiment, tilt is imparted to the needle 40 by diagonally mounting the cartridge 46 in the tone arm 49. In this embodiment the means for mounting the stylus with respect to the plane of the record disc constitutes the cartridge 46 and the elements depending therefrom, and associated with the stylus 40. As indicated by the dashed line alternative position of the needle 40 in Fig. 15, the cartridge can be inclined in either direction in order to impart the necessary tilt to the needle, one position being shown in full lines in Fig. 15 and the other position being shown in dashed lines. It will, of course, be obvious in the light of this disclosure that provision can be made, as by lugs and lock screws, for adjustably tilting the cartridge in either direction.

Figure 16:
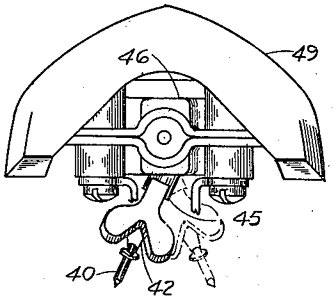

In the Fig. 16 embodiment, the cartridge 46 is again secured to the tone arm 49 in conventional manner, but the coupler member 45 is secured to the cartridge with an initial angular tilt. Again, as indicated by the full and dashed lines, the needle may be angularly disposed in either direction relative to the record disc grooves. In this embodiment the coupler or connector 45 and the elements depending therefrom and associated with the needle 40 constitute the mounting means for imparting angular tilt to the needle.

Figure 17:
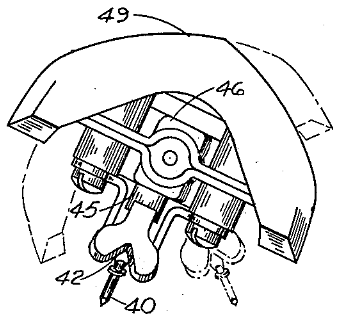

In the fourth embodiment shown in Fig. 17, the tone arm 49 may be tilted to either of the positions indicated by the full or dashed lines to tilt the needle 40 in the corresponding direction. Various other equivalent arrangements will now be obvious to those who have this disclosure before them, such as tilting of the turntable or bending the shank of needle 40. It is thought that the disclosure should be fairly confined within reasonable limitations by describing the illustrative embodiments shown and designating all embodiments, with their equivalents, in the claim by the use of "means" expressions.

Referring now to Figs. 5 through 13, the grooves in Figs. 5, 8, and 11 are of the RCA type, drawn to an extremely large scale. The grooves in Figs. 6, 9, and 12 are of the Columbia type and the Figs. 7, 10, and 13 are of the standard type.

In Figs. 5, 6, and 7 there is shown a stylus suitable for use in the combination of the invention. This stylus has an included angle of 100° and is tilted away from the vertical by 10°.

Figs. 8, 9, and 10 show another suitable stylus, in this case having an included angle of 80° and tilted from the vertical by 20°.

A third stylus is shown in Figs. 11, 12, and 13. The last illustrative stylus has an included angle of 50° and is tilted 35° from the vertical. It will be seen in each instance by an inspection of these figures that each stylus has a portion which contacts the shoulder of each groove and a tip portion which contacts the opposite side wall, at a point located above the point of tangency of the grooved bottom and the side wall. In this manner the stylus is positively driven at two points on opposite sides of a groove and it follows the modulations with great fidelity. Additionally, the stylus does not contact the rougher areas on the grooved bottom. It will be seen that by imparting additional tilt to the sylus a wide range of stylus designs, having different cone angles, may be employed. It will also be apparent that the life of both needle and record disc are increased by tilting the needle in one direction and at a later time tilting it in another direction, thereby to achieve maximum utilization of stylus contact areas.

While there have been shown and described what are at present considered to be the preferred embodiments of the present invention, it will be apparent to those skilled in the art that various changes, modifications, and substitutions of equivalents may be made without departing from the true scope of the invention as defined by the appended claim.

I claim:

In a sound reproducing device of the type which includes a tone arm and means secured to the tone arm for generating electrical signals representative of sound as modulated on any one of a plurality of distinct types of record discs having laterally modulated V-shaped grooves, said grooves terminated in a bottom radius and having average dimensions approximate as follows:

First, a large groove type having an 88° included angle, a groove width of 0.006 inch and a bottom radius of 0.0023 inch, Second, a fine groove type having a groove angle of 85°, a groove width of 0.00275 inch and a maximum bottom radius of 0.00025 inch, Third, a fine groove type having a groove angle of 87°, a groove width of .00285 inch and a maximum bottom radius of .0002 inch, a vibration translation device for controlling said signal generator in accordance with said modulations comprising a stylus having a tip with a radius $R_p$ and a groove shoulder contacting portion, and mounting means for so supporting said stylus at an angle with respect to the plane of any one of said grooves so that the tip of said stylus contacts the side of that one of said grooves having the largest included angle at a point not lower than the line of tangency between its arcuate bottom and its side and so that the tip of said stylus contacts the smallest one of said grooves at a point below its shouldered top, the other groove contacting portion of said stylus always contacting the shouldered top of any groove with which it is employed on the side opposite to the side contacted by the tip, the slope angle and the radius $R_p$ of said stylus being chosen from points plotted within a triangular area on a frame of Cartesian coordinates, said area being bounded by the axis of ordinates and by the intersecting loci of the following equations:

$$(1)\qquad R_p \text{ in mils}=\frac{4.7\text{ Sin }S-1.3\,\dfrac{\cos S}{\tan G/2}}{(1-\text{Sin }(46.50-S}$$

$$(2)\qquad R_p \text{ in mils}=\frac{2.5}{.7660-\dfrac{.6428}{\tan S'}+\dfrac{1}{\text{Sin }S'}}$$

the values $R_p$ and S being plotted as abscissae and ordinates respectively, to define the locus for equation (1), the values $R_p$ and S′ being respectively plotted in the same manner to define the locus for equation (2), wherein $R_p$ is equal to the radius of the tip of said conical stylus, S is equal to the angle between the side of the stylus and the plane surface of the record type with the largest angled groove, and S′ is equal to the angle between the side of the stylus and the plane surface of the record type having the smallest angled groove.

JOHN DRYSDALE REID.

REFERENCES CITED

The following references are of record in the file of this patent:

UNITED STATES PATENTS

| Number | Name | Date |
|---|---|---|
| 1,202,739 | Knippenberg | Oct. 24, 1916 |
| 1,261,541 | Huseby | Apr. 2, 1918 |
| 1,345,756 | Emerson | July 6, 1920 |
| 1,425,018 | Jones et al. | Aug. 8, 1922 |
| 1,992,893 | Thomas | Feb. 26, 1935 |